(12) United States Patent
Koller et al.

(10) Patent No.: US 11,840,263 B1
(45) Date of Patent: Dec. 12, 2023

(54) METHOD FOR CONTROLLING AN AUTOMATED DRIVING OPERATION OF A VEHICLE

(71) Applicant: MERCEDES-BENZ GROUP AG, Stuttgart (DE)

(72) Inventors: Micha Koller, Pliezhausen (DE); Hubert Rehborn, Sindelfingen (DE); Frank Starman, Boeblingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/265,486

(22) PCT Filed: Oct. 13, 2021

(86) PCT No.: PCT/EP2021/078309
§ 371 (c)(1),
(2) Date: Jun. 6, 2023

(87) PCT Pub. No.: WO2022/122225
PCT Pub. Date: Jun. 16, 2022

(30) Foreign Application Priority Data

Dec. 7, 2020 (DE) ..................... 10 2020 007 437.5

(51) Int. Cl.
*B60W 60/00* (2020.01)
*B60W 30/18* (2012.01)
*B60W 50/08* (2020.01)

(52) U.S. Cl.
CPC .. *B60W 60/0053* (2020.02); *B60W 30/18163* (2013.01); *B60W 50/082* (2013.01);
(Continued)

(58) Field of Classification Search
None
See application file for complete search history.

(56) References Cited

U.S. PATENT DOCUMENTS 9,247,523 B1 * 1/2016 Bhatia ..................... H04W 4/02
11,441,916 B1 * 9/2022 Konrardy ........... G01C 21/3617
(Continued)

FOREIGN PATENT DOCUMENTS

DE 102011082375 A1 3/2013
DE 102013210395 A1 12/2014
(Continued)

OTHER PUBLICATIONS

International Search Report and Written Opinion dated Feb. 16, 2022 in related/corresponding International Application No. PCT/EP2021/078309.

(Continued)

*Primary Examiner* — Jonathan M Dager
(74) *Attorney, Agent, or Firm* — PATENT PORTFOLIO BUILDERS PLLC

(57) ABSTRACT

A method for controlling an automated driving operation of a vehicle involves authorizing the automated driving operation according to a number of predetermined conditions. Traffic information and event information is received by the vehicle. The traffic information contains place- and time-referenced information about a traffic jam on a part of the route lying ahead of the vehicle and the event information contains place- and time-referenced information about an event on the part of the route lying ahead. The traffic information and the event information are evaluated by the vehicle as belonging together if these are close together in terms of place and time. The automated driving operation of the vehicle is not authorized if event information and traffic information is available for a predetermined prediction horizon, but only then if these are evaluated as not belonging together.

9 Claims, 1 Drawing Sheet

(52) U.S. Cl.
CPC ..... *B60W 2520/10* (2013.01); *B60W 2552/10* (2020.02); *B60W 2554/406* (2020.02); *B60W 2554/4042* (2020.02)

(56) References Cited

U.S. PATENT DOCUMENTS

| | | | |
|---|---|---|---|
| 11,524,706 B2 * | 12/2022 | Kunihiro | B60W 50/14 |
| 11,584,398 B2 * | 2/2023 | Ito | B60W 60/001 |
| 2016/0055750 A1 * | 2/2016 | Linder | G08G 1/16 |
| | | | 340/905 |
| 2017/0098373 A1 * | 4/2017 | Filley | H04W 4/90 |
| 2017/0270413 A1 * | 9/2017 | Moreira-Matias | G08G 1/0129 |
| 2017/0305420 A1 * | 10/2017 | Desens | G05D 1/0238 |
| 2018/0107216 A1 * | 4/2018 | Beaurepaire | G06Q 30/0261 |
| 2019/0041850 A1 * | 2/2019 | Chase | G08G 1/0967 |
| 2019/0047584 A1 * | 2/2019 | Donnelly | B60W 30/025 |
| 2019/0147736 A1 * | 5/2019 | Camp | G08G 1/0133 |
| | | | 340/905 |
| 2020/0089243 A1 * | 3/2020 | Poeppel | B60W 60/00182 |
| 2020/0133288 A1 * | 4/2020 | Abari | G05D 1/0088 |
| 2020/0286309 A1 * | 9/2020 | Chellapilla | G07C 5/085 |
| 2021/0331690 A1 * | 10/2021 | Pierfelice | H04W 4/40 |
| 2021/0404818 A1 * | 12/2021 | Xu | G01C 21/3461 |
| 2022/0018676 A1 * | 1/2022 | Haugaard | G01C 21/3484 |
| 2022/0137641 A1 * | 5/2022 | Stenneth | G05D 1/0212 |
| | | | 701/23 |
| 2022/0204026 A1 * | 6/2022 | Kim | G01C 21/3415 |
| 2023/0191986 A1 * | 6/2023 | Eriksson | B60W 50/0097 |
| | | | 340/468 |

FOREIGN PATENT DOCUMENTS

| | | |
|---|---|---|
| DE | 102014013672 A1 | 4/2015 |
| DE | 102014014120 A1 | 4/2015 |
| DE | 102013225011 A1 | 6/2015 |
| DE | 102018003572 A1 | 10/2018 |
| DE | 102020001679 A1 | 10/2020 |
| EP | 3197739 B1 | 10/2021 |

OTHER PUBLICATIONS

Office Action created Aug. 16, 2021 in related/corresponding DE Application No. 10 2020 007 437.5.

* cited by examiner

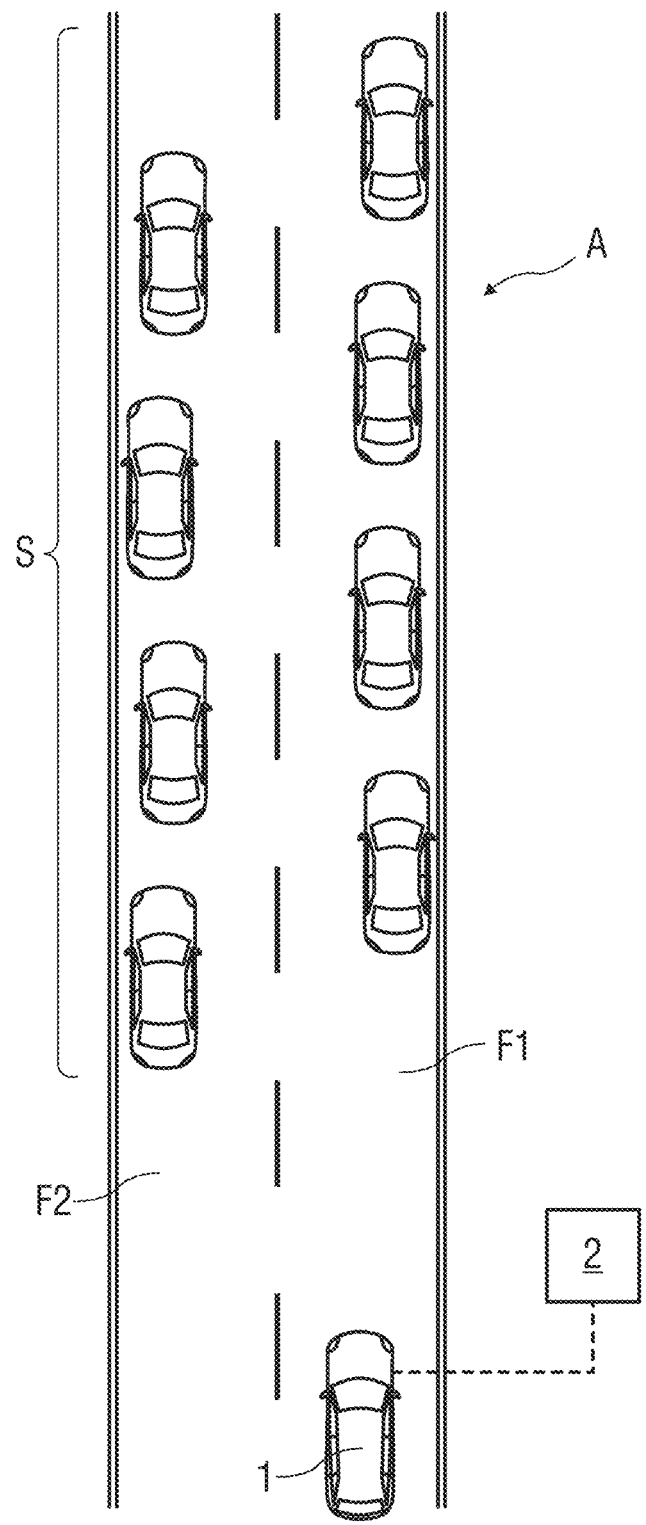

METHOD FOR CONTROLLING AN AUTOMATED DRIVING OPERATION OF A VEHICLE

BACKGROUND AND SUMMARY OF THE INVENTION

Exemplary embodiments of the invention relate to a method for controlling an automated driving operation of a vehicle, wherein the automated driving operation is authorized in accordance with a number of predetermined conditions.

A method for the automated driving operation of a vehicle on a route lying ahead of the vehicle is known from DE 10 2014 014 120 A1. The autonomous driving operation is then only authorized if one or more conditions is or are fulfilled for a predetermined distance of the route lying ahead of the vehicle. The conditions specified in this case are that a structural separation is present on at least one side of a current road the vehicle is on, that a lane the vehicle is in has a minimum lane width, that there are no crests or dips that significantly restrict the range of environment detection sensors, that the number of lanes does not change, that there is no tunnel, that there is no building on the road, that a radius of curvature of the lane the vehicle is in is larger than a predetermined limit value, that there is no traffic disruption, that there is no traffic report about dangerous situations and that there is no traffic report about the presence of road works.

Exemplary embodiments of the invention are directed to a method for controlling an automated driving operation of a vehicle.

A method for controlling an automated driving operation of a vehicle, wherein the automated driving operation is authorized in accordance with a number of predetermined conditions, provides according to the invention that traffic information and event information is received by the vehicle, wherein the traffic information contains place- and time-referenced information about a traffic jam on a part of the route lying ahead of the vehicle and the event information contains place- and time-referenced information about an event on the part of the route lying ahead. The event is preferably a safety-critical event, for example involves an object on the street, in particular a vehicle that has broken down or had an accident, which represents a potential danger for the vehicle or other road users at the location of the event. The traffic information and the event information are evaluated by the vehicle as belonging together if these are close together in terms of place and time, i.e. are valid for the same place and the same time or at least if a distance of the place for which the traffic information is valid from the place for which the event information is valid falls below a predetermined distance limit value and a time interval between the time for which the traffic information is valid and the time for which the event information is valid falls below a predetermined time interval limit value. The automated driving operation of a vehicle is not authorized if event information and traffic information are available for a predetermined prediction horizon, but only then if these are evaluated as not belonging together. I.e., if the available event information and traffic information are evaluated as belonging together, their presence should not lead to a non-authorization of the automated driving operation.

Preferably, the automated driving operation is then also not authorized if event information but no traffic information is available for the predetermined prediction horizon.

When the automated driving operation is not authorized, the automated driving operation is preferably blocked for activation, if it is deactivated, or is ended and blocked for activation, if it is already activated. When the automated driving operation is not authorized, a vehicle user is thus denied the opportunity to activate or continue the automated driving operation.

By means of using the method, the automated driving operation is then only offered to the vehicle user on-board if comparatively few disrupting external influences, in particular events, are to be expected on the part of the route lying ahead.

The method provides that the traffic information and the event information is made available to the vehicle via a traffic service as a source of information, wherein a traffic event is combined with place- and time-referenced criteria in the vehicle, in order to provide, to prohibit, to end, or to carry out an automated driving operation.

In particular, the automated driving operation is authorized if a traffic jam on the part of the route lying ahead of the vehicle is received as traffic information by the vehicle, whereas if the traffic information is that there is a traffic event without a traffic jam, the automated driving operation is not authorized or a takeover request is output to the vehicle user to carry out a driving task. A traffic event, e.g., objects on a road, can cause problems for the vehicle in the automated driving operation, without a traffic state of a traffic jam prevailing. Without the traffic state of a traffic jam, such a traffic event is comparably dangerous for the vehicle, wherein this traffic event is rather unproblematic in a comparably slow journey of the vehicle in a moving traffic jam.

If it is thus determined that traffic information received on-board, in particular traffic jam information, does not correlate with a reported traffic event, then the automated driving operation of the vehicle is ended.

The method represents a so-called traffic jam piloting, so that comfort for the vehicle user can be significantly increased when the vehicle is driving in a traffic jam, provided the automated driving operation is authorized.

In an embodiment of the method, the automated driving operation of the vehicle is not authorized or is ended if a current driving speed of the vehicle exceeds a predetermined upper speed limit. The upper speed limit in relation to driving speeds in the traffic state of a traffic jam is thereby predetermined, in order to be able to ensure a safety for the vehicle, wherein, if a driving speed exceeds the predetermined upper speed limit on all lanes running in the same direction, the automated driving operation is not authorized. The vehicle user can therefore then only use the automated driving operation if there is a traffic jam on the part of the route if a traffic flow speed falls below the predetermined upper speed limit on at least one lane, wherein the vehicle moves itself onto this lane. For example, the upper speed limit is 60 km/h.

A further embodiment provides that the automated driving operation of the vehicle is not authorized if a current driving speed of the vehicle falls below a predetermined upper speed limit, but this limit is met within a predeterminable time period.

If it is determined that the traffic state of a traffic jam will resolve within the predetermined time period, and thus the driving speed of the vehicle will exceed the predetermined upper speed limit, since there will then be a traffic state of free traffic movement, then the automated driving operation is not authorized, since the vehicle in the automated driving operation, in which the vehicle can have a driving speed up to the predetermined upper speed limit, otherwise represents a traffic obstruction for following vehicles in the lane the vehicle is in.

In the event that traffic is flowing in one lane or in several lanes with a current driving speed that falls below the predetermined upper speed limit on a multi-lane part of the route, then, in a development of the method, the vehicle moves itself into this lane or into one of these lanes in which the upper speed limit is not being reached. The vehicle therefore moves itself into a lane in which vehicles are driving at a speed that falls below the predetermined upper speed limit, so that the vehicle is not a traffic obstruction for faster-driving vehicles.

A further possible embodiment of the method provides that the vehicle moves itself into one of the lanes in which the traffic is flowing with a current driving speed, the difference between which and the upper speed limit is the smallest. The vehicle therefore does not automatically change into the lane in which vehicles are driving at the lowest speed, rather into the lane where the speed is the highest, but falls below the upper speed limit. It can thus be ensured as far as possible that, in a wide, moving traffic jam, the vehicle nevertheless moves forward comparatively quickly in the automated driving operation, in order to reach its destination.

In a possible development, in a decision made during the automated driving operation to not authorize the automated driving operation, a driving task is transferred to a vehicle user after outputting a takeover request. As soon as the vehicle user, for example, operates a steering wheel with both hands, the automated driving operation is ended, so that the vehicle user carries out the driving task and the vehicle is moved into manual driving operation.

Exemplary embodiments of the invention are illustrated in greater detail below by means of the sole drawing.

BRIEF DESCRIPTION OF THE SOLE DRAWING

Here:

The sole drawing schematically shows a vehicle on a multi-lane part of a route and a traffic service.

DETAILED DESCRIPTION

The sole Figure shows a part of the route A, in particular of a motorway, with two lanes F1, F2 running in the same direction, wherein a vehicle 1 is driving in a right-hand lane F1 and is moving towards a traffic jam S. The vehicle 1 is connected with a traffic service 2 by means of a wireless data connection.

The vehicle 1 has an assistance system for automated driving operation, in which a driving task is carried out entirely by the vehicle 1 itself, so that a vehicle user of the vehicle 1 can, for example, pursue another activity.

In order to enable the automated driving operation of the vehicle 1 only being offered to the vehicle user on-board if, if possible, comparatively few disrupting influences are to be expected on the part of the route lying ahead of the vehicle A, a method described in the following is provided.

The method in particular provides that, via a traffic service 2 as the information source, related traffic events are combined with place- and time-referenced criteria, in order to provide and authorize, to not authorize, to end, or to carry out an automated driving operation.

To this end, the vehicle 1 has a control unit, which is configured to receive traffic information and event information from the traffic service 2, wherein the automated driving operation of the vehicle 1 can also be carried out in a present traffic state of a traffic jam S.

The method described in the following represents a so-called traffic jam piloting, so a traffic jam assistance program, for the vehicle 1, wherein the vehicle 1 can be moved in the automated driving operation with a driving speed up to a predetermined upper speed limit, of e.g., 60 km/h.

The traffic information received by the vehicle 1 contains place- and time-referenced information about traffic jams S on the part of the route A lying ahead of the vehicle 1, wherein the event information contains information about events on the part of the route A.

The control unit receives information from the traffic service 2, for example a navigation system of the vehicle 1, and subsequently decides whether the automated driving operation is possible.

This information from the traffic service 2 can be available e.g., on a motorway in any combination, including combinations at different times. A distinction is thereby drawn between traffic information without event information, event information without traffic information, event information near traffic information, i.e., near a traffic state, event information behind traffic information, i.e., behind a traffic state, etc.

In particular, the automated driving operation of the vehicle 1 is not authorized if there is a certain traffic event, i.e., event information, for example that there are objects on a road, at a certain temporal-spatial distance from the vehicle 1.

If the vehicle 1 receives such event information, it can be about a situation which the vehicle 1 cannot cope with in the automated driving operation and which can thus be dangerous for the vehicle 1, so that the automated driving operation is not offered in the first place and is also not authorized if such event information is received.

By contrast, the automated driving operation of the vehicle 1 is authorized if such event information is available within a parameterizable temporal-spatial distance from the vehicle 1, in connection with traffic information relating to a traffic state of a traffic jam S. A cause of the traffic information about the traffic jam S is thereby explained by means of the event information, wherein the vehicle 1 can be automatedly moved in the traffic jam S. In the traffic jam S, i.e., in the automated driving operation with comparatively low driving speed, the traffic event transmitted in the form of the event information to the vehicle 1 does not represent a problematic situation.

If the vehicle 1 thus receives the event information "objects on the road" and there is no further traffic information about this event information, then the automated driving operation is not authorized after receiving this event information, so that the vehicle user cannot activate the automated driving operation.

If the automated driving operation is activated when this traffic information is received, then a takeover request is output to the vehicle user, so that they take over and carry out the driving task of the vehicle 1.

However, if the control unit receives the event information "objects on the road" and associated traffic information, in particular relating to the prevailing traffic state due to the traffic event, is additionally transmitted to the vehicle 1, then the automated driving operation of the vehicle 1 continues to be authorized, because a traffic jam situation as the traffic information can be handled independently of a cause of the traffic jam, i.e. independently of the event information, by the vehicle 1 driving in the automated driving operation.

If the vehicle 1 is driving in automated driving operation in the traffic jam S towards an obstacle on the road, which is the traffic event causing the traffic jam S, the obstacle can be located in a left lane F2 or the vehicle 1 can carry out a lane change from the right lane F1 into the left lane F2 at an appropriate driving speed in order to avoid the obstacle.

The automated driving operation of the vehicle 1 when using the method is always authorized if the traffic state of a traffic jam S is available as traffic information independent of the event information.

If there is no traffic jam S as traffic information and the vehicle 1 receives a traffic event, then a takeover request is output to the vehicle user and the automated driving operation is deactivated.

Further possible traffic events, due to the presence of which the automated driving operation is not authorized or is deactivated, are, for example: accidents, road works, lane narrowing, impassability, a slippery road, aquaplaning, fire on the road, animals on the road, etc.

When traffic information and event information are received, it is evaluated on-board whether these belong together. This is, in particular, suspected if the traffic event and the traffic state are comparatively close to each other in terms of temporal-spatial distance.

In the case that, where there is a comparatively low distance and temporal latency between the traffic information and the event information, it can be assumed that these belong together, the event information can be ignored for a decision on the authorization of the automated driving operation. It is thereby possible to use the automated driving operation more often than if the decision is made depending on events and a takeover request is output to the vehicle user of the vehicle 1 at every traffic event.

If it is determined that the traffic information, in particular in relation to the traffic state, and the event information do not belong together, then both the traffic information and also the event information are taken into consideration.

The vehicle 1 can indeed cope with the traffic jam S in the automated driving operation, but not with the traffic event, so the automated driving operation is ended.

In other words: If it is determined that the present traffic information and the present event information can be regarded as not belonging together, in particular due to the temporal-spatial distance, then the automated driving operation of the vehicle 1 is ended.

The traffic information and event information belonging together can, e.g., depending on information quality, be parameterized.

For example, received traffic information and received event information are regarded as belonging together if there is a distance of 2 km between the traffic information, in particular the traffic state, and the traffic event, for example an accident.

As explained above, a speed limit is predetermined for the automated driving operation of the vehicle 1 of, for example, 60 km/h.

In the case that the traffic information includes the information that, in the traffic jam S as the traffic state, vehicles can be driven at a speed of 0 km/h to 85 km/h, then the vehicle 1, if this is driving in the automated driving operation with a maximum speed of 60 km/h, can represent a traffic obstruction, in particular for following traffic.

In order to be able to prevent in such a situation as far as possible that the vehicle 1 forms a traffic obstruction in the automated driving operation, the vehicle 1 moves itself into one of the lanes F1, F2 on which traffic is flowing with a driving speed that falls below the predetermined upper speed limit if it reaches the predetermined upper speed limit or is estimated to reach it within a predeterminable time period.

If the vehicle 1 is driving on a three-lane part of the route A and the traffic is flowing with a current driving speed of 10 km/h in the right-hand lane F1, of 30 km/h in a central lane (not shown), and of 60 km/h in a left-hand lane F2, then an embodiment of the method provides that the vehicle 1 can also move itself into the left-hand lane F2, since the driving speed of 60 km/h corresponds to the predetermined upper speed limit.

The vehicle 1 therefore moves itself into the lane F1, F2, the driving speed of which does not exceed the predetermined upper speed limit. In particular, the vehicle 1 moves itself into the lane F1, F2 with the driving speed that is the highest, but falls below the upper speed limit, so that a time delay of the vehicle 1 due to the traffic jam S can be lowered.

If the vehicle 1 is driving in a lane F1, F2 on which the traffic is flowing with a driving speed that exceeds the predetermined upper speed limit, then the vehicle 1 carries out a lane change into a lane F1, F2 with a driving speed that falls below the predetermined upper speed limit or, in the case that nothing is driving at that driving speed, a takeover request is output to the vehicle user and the automated driving operation is ended.

The method furthermore provides that the automated driving operation of the vehicle 1 is not authorized in such a resolving traffic jam S, with a so-called falling tendency, and is authorized in an increasing traffic jam S, with a so-called increasing tendency.

The automated driving operation of the vehicle 1 is thereby not authorized, since the driving speed of the vehicle 1 is restricted by the predetermined upper speed limit.

Since it should be prevented as far as possible that the vehicle 1 represents a traffic obstacle for the following traffic due to the driving speed limited by means of the upper speed limit in the automated driving operation, the automated driving operation of the vehicle 1 is only authorized further if the traffic jam S resolves or is possible if the vehicle 1 continues to drive at a driving speed below the predetermined upper speed limit, for example due to a speed restriction or because the vehicle 1 e.g., is following behind a comparatively slow-moving vehicle, for example a lorry.

The vehicle 1 driving in the automated driving operation thus drives with the flowing traffic, so long as the driving speed falls below the predetermined upper speed limit. If the current driving speed exceeds the predetermined upper speed limit, a takeover request is output to the vehicle user.

If the traffic jam S resolves within a comparatively short time period, for example in 5 minutes, the automated driving operation of the vehicle 1 is not authorized, since this can only be used for a relatively short time, including a handover and takeover time.

The fact that the traffic state of a traffic jam S resolves in a corresponding time period can fundamentally be inferred from traffic information received on-board.

The method thus implies behavior rules for the vehicle 1, so that the automated driving operation of the vehicle 1 is, in principle, permissible when there is a traffic jam reported as the traffic information, without event information being taken into consideration. The respective behavior rules for the place- and time-referenced combination of traffic information and event information for the control unit are managed, saved, and adjusted by means of a central computing unit (not shown in more detail) with which the vehicle 1, in particular the control unit, is continuously connected.

The automated driving operation is, however, not authorized if there is only event information, without a traffic jam being reported as the traffic information.

The upper speed limit up to which the automated driving operation is authorized in the traffic state of a traffic jam S can be determined in a vehicle-specific and place- as well as time-referenced manner and transmitted to the vehicle 1 by means of a central computing unit (not shown in more detail) with which the vehicle 1, in particular the control unit, is continuously connected.

Depending on respective event information available to the vehicle 1, behavior rules of the vehicle 1 are adjusted. A minimum distance to be observed between the vehicle 1 and the traffic driving ahead thus increases if it has been transmitted as event information that there are objects on the road.

The minimum distance also increases and a reduction of the driving speed of the vehicle 1 is initiated if there is aquaplaning, heavy rain, etc. as the event information.

A mapping rule hereby defines the respective traffic event, a place- and time-referenced distance to traffic jam information, i.e., to a report of a traffic jam, in particular to traffic information in relation to a traffic state, and a respective consequence for the automated driving operation of the vehicle 1.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for controlling an automated driving operation of a vehicle, wherein the automated driving operation is authorized according to a number of predetermined conditions, the method comprising:
receiving, by the vehicle, traffic information and event information, wherein the traffic information contains place- and time-referenced information about a traffic jam on a part of a route lying ahead of the vehicle and the event information contains place- and time-referenced information about an event on the part of the route lying ahead; and
evaluating, by the vehicle, the traffic information and the event information as belonging together if the traffic information and event information are close together in terms of place and time,
wherein the automated driving operation of the vehicle is not authorized if event information and traffic information are available for a predetermined prediction horizon, but only when the event information and traffic information are evaluated as not belonging together.

2. The method of claim 1, wherein the automated driving operation of the vehicle is not authorized if the event information is available for the predetermined prediction horizon but no traffic information is available for the predetermined prediction horizon.

3. The method of claim 1, wherein the automated driving operation of the vehicle is not authorized if a current driving speed of the vehicle exceeds a predetermined upper speed limit.

4. The method of claim 1, wherein the automated driving operation of the vehicle is not authorized if a current driving speed of the vehicle falls below a predetermined upper speed limit, but the predetermined upper speed limit is met within a predeterminable time period.

5. The method of claim 3, wherein in an event that traffic is flowing in one lane or in several lanes with a current driving speed below the predetermined upper speed limit on a multi-lane part of the route, the vehicle moves itself into the one lane or into one of the several lanes.

6. The method of claim 5, the vehicle moves itself into the one of the several lanes in which the traffic is flowing with a current driving speed, the difference between which and the upper speed limit is smallest.

7. The method of claim 1, wherein, in a decision made during the automated driving operation to not authorize the automated driving operation, a driving task is transferred to a vehicle user after outputting a takeover request.

8. The method of claim 1, wherein the non-authorization of the automated driving operation has a consequence that the automated driving operation is blocked for activation if it is deactivated or is ended and blocked for activation if it is activated.

9. The method of claim 1, wherein the event information applies to an event representing a potential danger for the vehicle or other road users.

* * * * *